Aug. 27, 1968  S. B. COHN  3,399,345
PRECISION RADIO FREQUENCY ENERGY PHASE MEASURING SYSTEM
Filed June 3, 1966  7 Sheets-Sheet 1
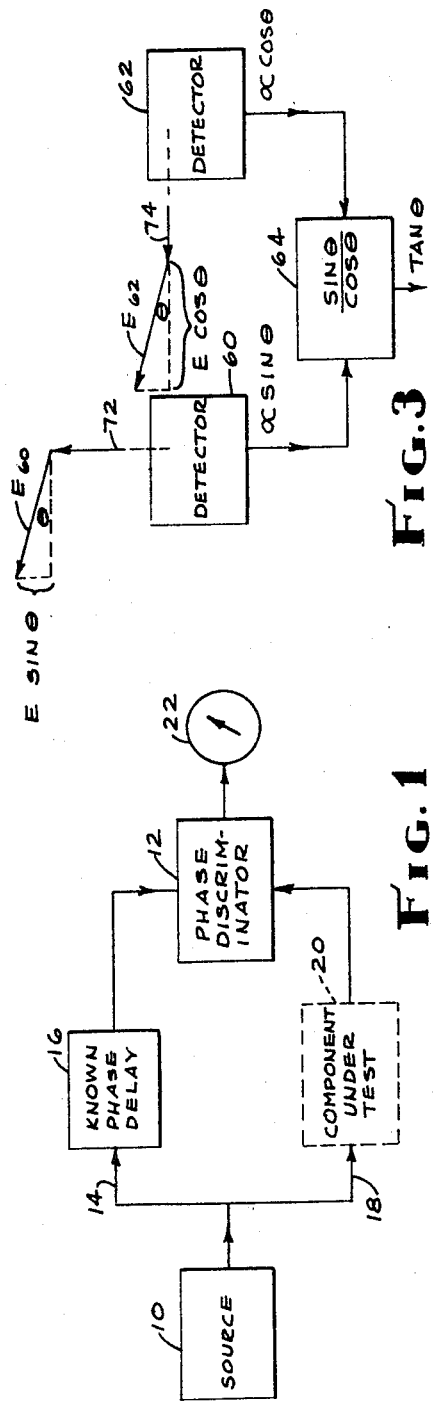
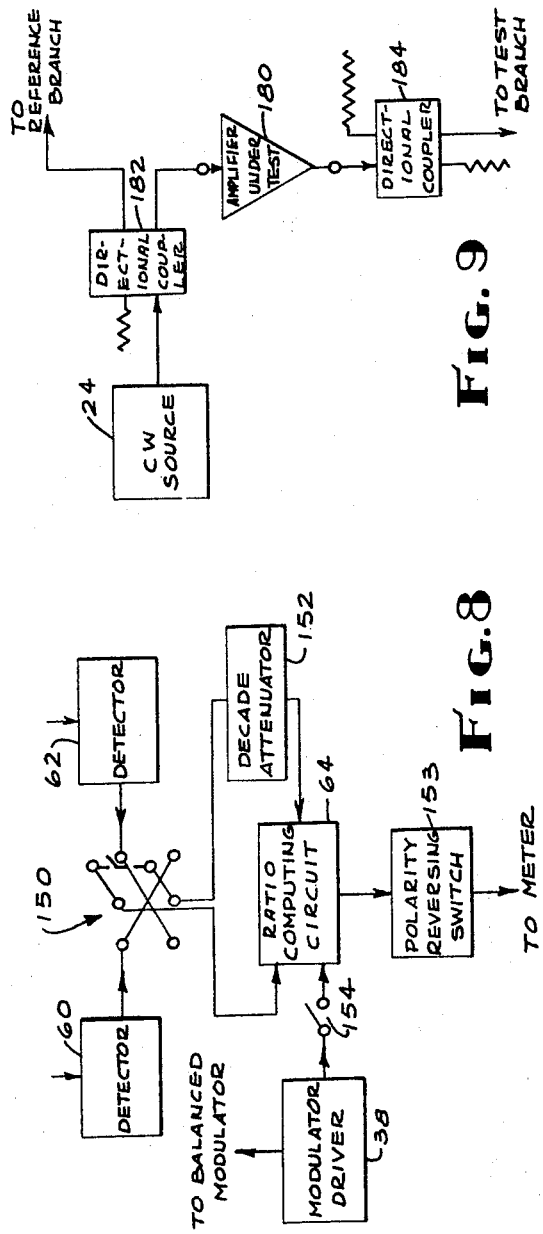
Seymour B. Cohn
INVENTOR.
BY
Nilsson, Robbins & Anderson
ATTORNEYS.

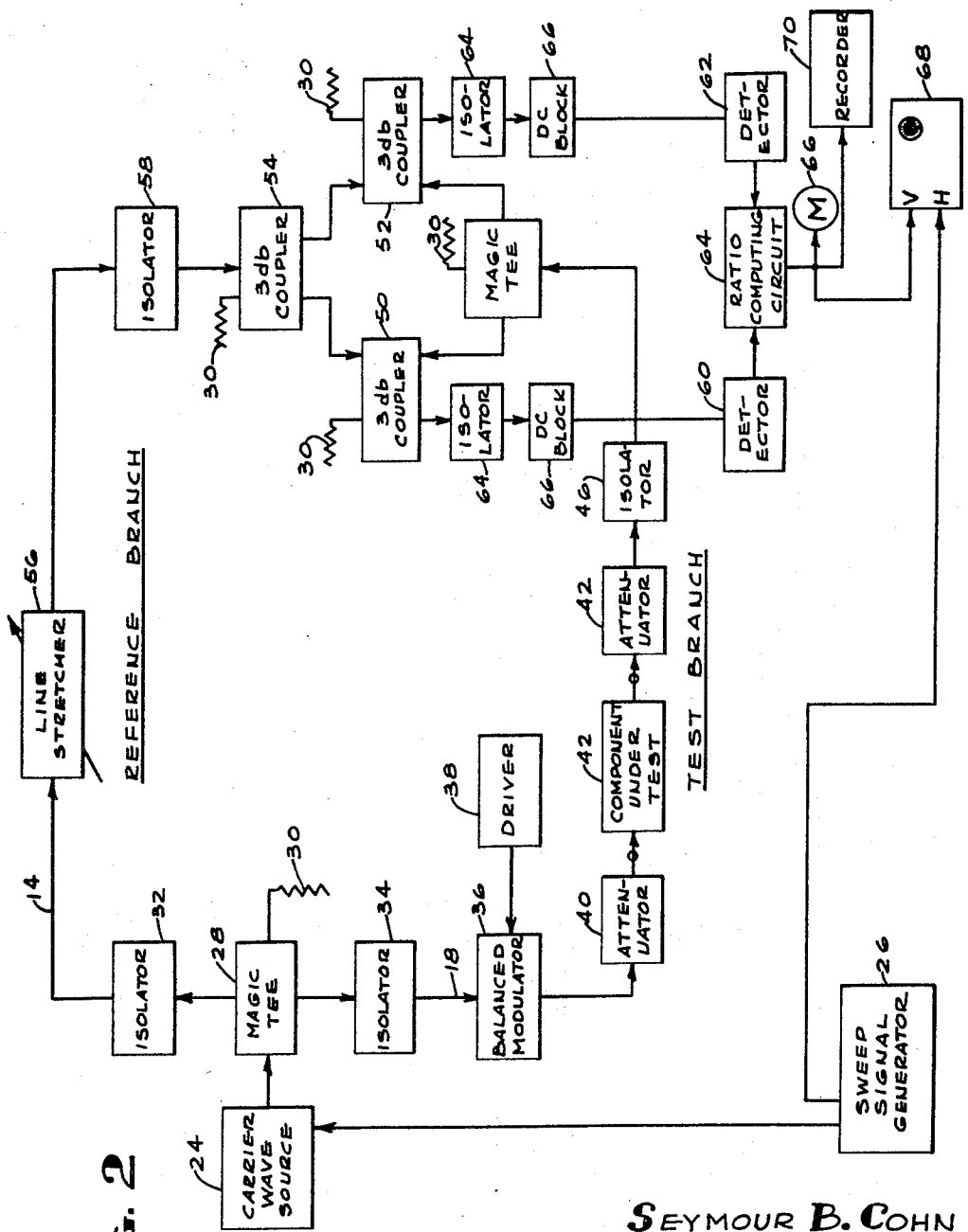

SEYMOUR B. COHN
INVENTOR

BY
Nilsson, Robbins & Anderson
ATTORNEYS.

Aug. 27, 1968         S. B. COHN         3,399,345
PRECISION RADIO FREQUENCY ENERGY PHASE MEASURING SYSTEM
Filed June 3, 1966                       7 Sheets-Sheet 4

SEYMOUR B. COHN
INVENTOR

BY
Nilsson, Robbins & Anderson
ATTORNEYS.

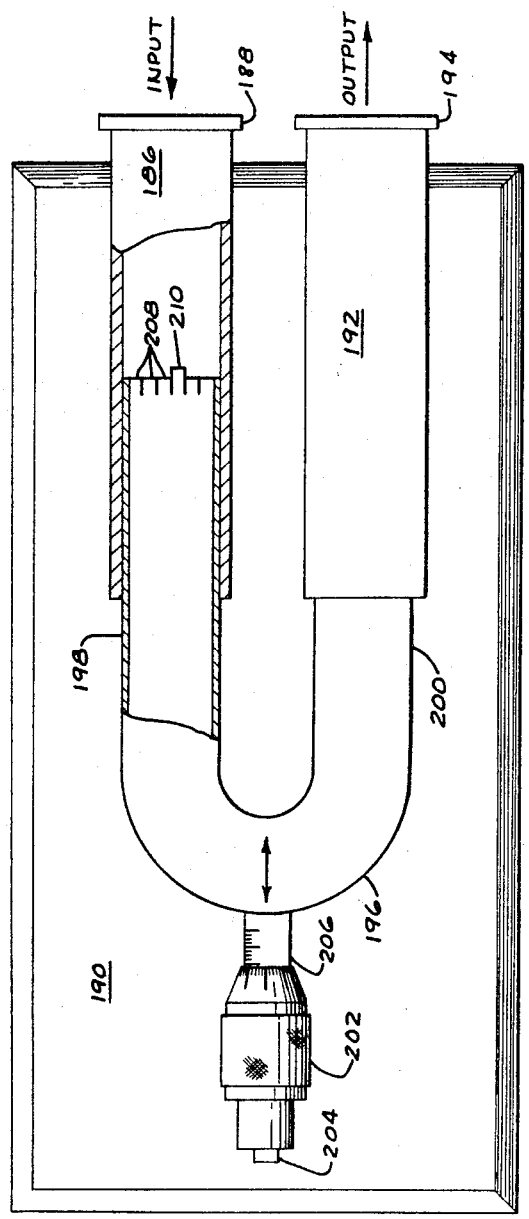

SEYMOUR B. COHN
INVENTOR.

BY
Nilsson, Robbins & Anderson
ATTORNEYS.

SEYMOUR B. COHN
INVENTOR.

BY
Nilsson, Robbins & Anderson
ATTORNEYS.

United States Patent Office 3,399,345
Patented Aug. 27, 1968

3,399,345
PRECISION RADIO FREQUENCY ENERGY PHASE
MEASURING SYSTEM
Seymour B. Cohn, Tarzana, Calif., assignor to Emerson
Electric Company, St. Louis, Mo.
Continuation-in-part of application Ser. No. 273,609,
Apr. 17, 1963. This application June 3, 1966, Ser.
No. 555,024
3 Claims. (Cl. 324—84)

ABSTRACT OF THE DISCLOSURE

Disclosed is a system for accomplishing a measurement of deviations from phase linearity of microwave components wherein there is developed a reference signal and a test signal from a source of radio frequency energy which is split and applied simultaneously to two branches of the system, one of the branches passing through the components under test. The reference and test signals are brought together in a phase discriminator circuit wherein the energy from each of the two signals is split and recombined and thereafter applied to a pair of detectors in such a manner as to generate output signals which are proportional to sine $\theta$ and cosine $\theta$ which are then applied to means for displaying the ratio of the two signals.

---

This invention relates to systems for precision measurement of the phase shift effected on a radio-frequency signal by a circuit component.

This application is a continuation-in-part of copending United States patent application Ser. No. 273,609, filed Apr. 17, 1963, now abandoned, and assigned to the assignee of the present application.

It is a critical requirement in many modern electronic systems, such as for example sophisticated radar and microwave communication networks, that the phase shift characteristics of individual components be precisely known. Such characteristics may include for example, the phase shift at a particular frequency, phase shift as a function of frequency, or the deviation from linear of the latter; such deviation from linear phase versus frequency response being particularly important since it may cause particularly troublesome signal distortion. The linear phase or constant time delay response of the system components in modern communication systems has become increasingly important due to the increased density and complexity of the transmitted data. Similarly, in many radar tracking or guidance systems, linearity of phase is extremely important in achieving accuracy and high resolution.

In general, if the pertinent characteristics has been analyzed or measured, any deleterious effects it has on the operation of the system can be compensated for either in other associated portions of the system or in the component itself. An example of the latter is a microwave linear phase filter which typically as a final step in its manufacture, must be adjusted for linear phase response throughout its specified range of operation.

Heretofore ordinarily, it has been the practice to make point-by-point adjustments and readings of phase versus frequency (or another independent parameter) and then analyzing the observations to determine appropriate compensating techniques. Such non-direct procedures are arduous and time-consuming and must be done repeatedly to be certain that adjustments and compensations in the procedure have not interdependently required readjustment or redesign, of previous ones. In addition a compromise in assurance of accuracy is always required because of the finite number of point observations and adjustments that can be made within the realm of economic practicability in the design or manufacture of a particular component.

Other disadvantages of the prior art include deficiencies in repeatable resolution in observing or measuring the magnitude of phase delay. In this connection it is important in many modern applications to be able to read phase angles to at least one tenth of a degree. Other typical disadvantages of prior art systems are that their readings regarding phase distortion are not given directly and are dependent upon input test signal amplitude and insertion loss variations of the component under test. In addition, the phase delay characteristics of active components such as amplifiers could not be readily determined.

It is therefore an object of the present invention to provide a precision phase measurement system which is not subject to these and other disadvantages of the prior art.

It is another object to provide such a system which is inherently highly accurate having errors of less than one tenth of a degree at microwave frequencies over a wide frequency band of operation.

It is another object to provide such a system which is direct reading regarding absolute phase delay or a phase delay characteristic of a component under test as compared with a standard such as one having a linear phase delay.

It is another object to provide such a phase measurement system which may be frequency swept over a broad frequency band and which is not dependent upon test signal amplitude or insertion loss variations.

It is another object to provide such a system which is highly versatile and is adaptable to perform a wide variety of measurement tasks such as phase shift versus any variable parameter, or phase shift during the rise and fall of a pulse.

It is another object to provide a phase measurement system which is capable of measuring such phase characteristics of active devices such as traveling wave tube amplifiers, klystron amplifiers, tunnel diode amplifiers, parametric amplifiers, and the like, as well as those of passive devices such as filters and similar fixed components, ferrite phase shifters, modulators, isolators, circulators, semiconductor phase shifters and modulators, and complete radio frequency subsystems over an extremely wide range of the radio frequency spectrum.

It is another object to provide such a system which is capable of measuring relative phase of antenna array elements, effective center of feed element radiation, and variation of such characteristics with adjustment of other parameters.

It is another object to provide such a phase measurement system which may be adapted to operate over any portion of the microwave UHF, and VHF ranges.

It is another object to provide such a system which is electrically stable, mechanically rugged and dependable, and which is economically practicable for a wide range of users.

It is another object to provide such a system which provides in visual form substantially immediately the desired measurement or observation.

It is another object to provide such a system which is readily operable by relatively unskilled technicians or factory personnel.

Briefly, in accordance with the structural features of one example of the present invention, these and other objects and advantages are achieved in a phase distortion measurement network comprising a frequency swept generator of a microwave carrier wave signal which is divided at the generator output by a hybrid junction. The different portions of the signal energy are propagated through separate branches of the network designated test and reference branches, respectively, and recombined in a phase discriminator circuit which provides a signal which is a direct measure of the difference in the phase delays suffered by the signal portions in traversing the separate network branches.

The reference branch, in this example, has a linear phase versus frequency response and a magnitude of phase delay and phase versus frequency slope which are approximately equal to those of the component to be measured. A line stretcher device in the reference branch enables the operator to adjust the phase delay and phase slope.

The test branch includes a balanced modulator in series with the component under test. The modulation frequency is typically about 1000 cycles per second.

The phase discriminator circuit in this particular example comprises a 3 db directional coupler with its input arm coupled to the reference branch. Its output arms each feed one input arm of a respective combining hybrid. The other input arm of each of the combining hybrids is connected to the output arms of a magic tee hybrid, the input arm of which is coupled to the test branch of the network.

The output arm of each of the combining hybrids is coupled to a respective crystal detector and thence to a ratio measuring circuit which performs the function of a phase indicator. A meter on the phase indicator panel is directly calibrated in terms of phase angle. An output signal of the phase indicator may be impressed upon the vertical deflection plates of an oscilloscope while the frequency sweep signal of the mircowave signal generator is applied to the horizontal plates, resulting in a phase angle versus frequency display. Alternatively, these signals may be applied to an X–Y recorder to achieve a permanent plot of the data.

In the operation of this particular example, as will be more fully discussed below, the modulated signal from the test branch is divided and impressed upon the two detectors with the same phase because of the in-phase properties of the magic tee hybrid which is utilized to accomplish the division. The carrier wave signal from the reference branch on the other hand is divided by the quadrature phase 3 db directional coupler, and its separate portions arrive at the two detectors, with a 90 degree phase difference. Attenuator pads in the test branch ensure that the modulated signal is at least 20 db weaker than the carrier. At each detector then an addition process occurs in which the resultant of the two signals has a weak amplitude modulation impressed upon it. The modulation index is proportional to that portion of the modulated test branch signal which is in phase with the reference branch carrier wave. Since the test branch signals are in phase at the two detectors while the reference branch signals are in quadrature, the individual modulation indices are proportional respectively to sin $\theta$ and cos $\theta$, where $\theta$ is the phase angle between the signals from the two branches. The ratio computing circuit in the phase indicator then provides a signal which is proportional to tan $\theta$ and which thus constitutes a direct measure of the instantaneous phase angle $\theta$. This signal is applied to a meter calibrated in degrees, and may also be applied to an external oscilloscope or recorder.

As the frequency of the carrier wave generator is swept across the microwave band of interest, the angle $\theta$ may vary due to the difference in phase response of the branch including the component under test as compared with that of the reference branch; and a plot of this variation is presented on the face of the oscilloscope. If the component is adjustable regards its phrase delay characteristic, it can be adjusted so that the desired phase linearity is achieved in the component. If the component is not thusly adjustable, a compensating circuit or element may be inserted in series with the component until the observed response is deemed quantitatively satisfactory.

Further details of these and other novel features and their operation including for example, phase compensating means for providing automatic phase equalization of the nonsymmetrical elements (e.g. the quadrature phase producing elements) within the discriminator circuit over a very broad frequency range, as well as additional objects and advantages of the invention, will become apparent and be best understood from a consideration of the following description taken in connection with the accompanying drawings which are all presented by way of illustrative example only, and in which:

FIGURE 1 is an overall block diagram of a precision phase measurement system constructed in accordance with the principles of the present invention;

FIGURE 2 is a detailed block diagram illustrating a specific example of a phase measurement system of the present invention;

FIGURE 3 is primarily a phasor diagram useful in describing the operation of the invention;

FIGURE 8 is a schematic diagram of a sector switching circuit for use in combination with the present invention;

FIGURE 9 is a schematic diagram of a portion of a form of the invention alternative to that illustrated in FIGURE 2;

FIGURE 10 is a sectional view of a novel waveguide line stretcher constructed in accordance with the principles of the present invention;

Figure 4:
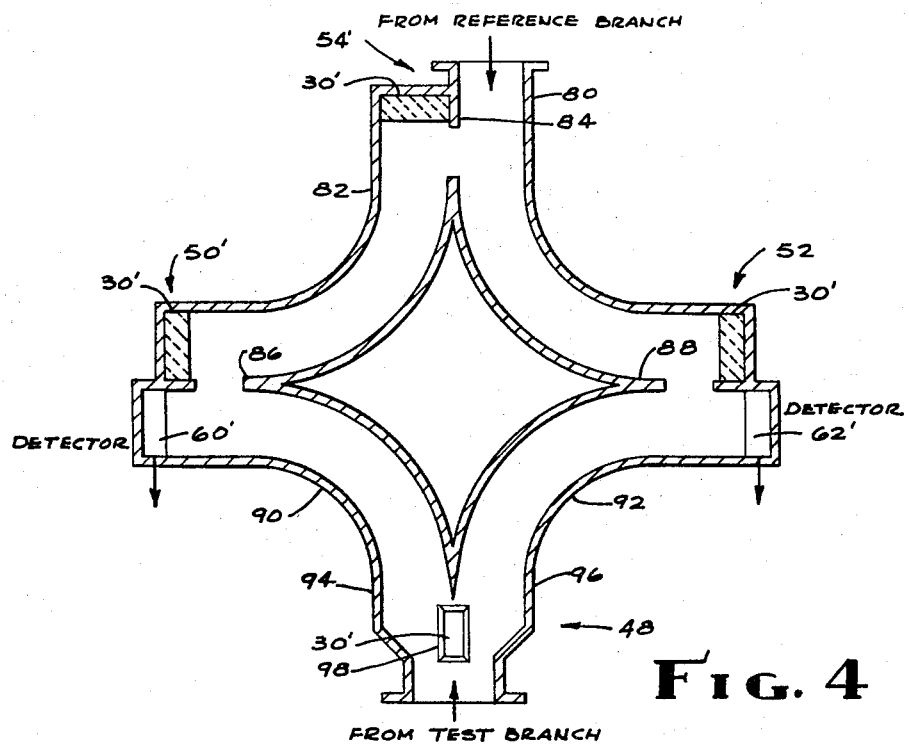
FIGURE 4 is a sectional view of a waveguide version of a portion of the phase discriminator circuit of FIGURE 1.

Referring to the figures in more detail it is stressed that the details shown are by way of example only and are presented in the cause of providing what is believed to be the most useful and readily understood description of the structural concepts and principles of operation of the invention. In this regard no attempt is made to show apparatus in greater detail than is necessary for a fundamental understanding of the invention, the description taken with the drawings making apparent to those skilled in the radio arts how the several forms of the invention may be embodied in practice. Specifically, the detailed showing is not to be taken as a limitation upon the scope of the invention which is defined by the appended claims forming along with the drawings a part of this specification.

In FIGURE 1 a fundamental structural combination of the invention is illustrated as including a source 10 of test signals which are divided with portions thereof traversing separate network branches before being compared with a phase discriminator circuit 12. A reference branch 14 includes an element 16 having a known phase delay characteristic while a test branch 18 includes the component 20 under test, whose phase delay or phase delay characteristic is to be determined.

The phase discriminator circuit 12 is of the character to provide an output signal, the magnitude of which is a direct measure of the instantaneous phase difference between the portions of the test signals after they have traversed the separate network branches 14, 18. The output signal of the phase discriminator is impressed upon a visual indicating device 22 which may be an oscilloscope or an analog meter or a recorder.

Referring to FIGURE 2 a detailed embodiment of the system illustrated in the block diagram of FIGURE 1 is illustrated. A microwave carrier wave source 24 having a microwave output signal which may be electrically adjusted to vary in frequency through-out a predetermined microwave region, such as, for example, the S-band or X-band. A sweep generator 26 is coupled to the control terminal of the source 24 and controls its frequency in a repetitive shaw-tooth fashion. The output energy of the source 24 is divided by a junction such as a magic tee hybrid 28 into two portions each traversing either the reference branch 14 or the test branch 18. The extra arm of the hybrid T 28 may be terminated with a resistive load 30. A pair of isolators 32, 34 are coupled to the output arms of the hybrid T 28 in each of the network branches 14, 18 in order to isolate the branches from each other and from the carrier wave source 24.

The output terminal of the isolator 34 in the test branch 18 is coupled to the input of a balanced modulator 36 which may be of the Faraday rotation type which consists essentially of an axial ferrite rod in a length of circular waveguide with a solenoid wound around its outer circumference. Its ends may connect axially to rectangular waveguides whose H-planes are orthogonal with respect to each other. Therefore when the solenoid current is zero there is no coupling between the rectangular waveguides; but as the current is increased, the Faraday rotation produces more and more coupling until at 90 degrees rotation substantially full transmission occurs. The amplitude response or degree of coupling is the same for either direction of solenoid current flow, but with a 180 degree output phase difference. Therefore if the current is varied sinusoidally at 1000 cycles per second the output signal is amplitude modulated at the rate of 2000 cycles per second and its spectrum will be that of a double-sideband suppressed-carrier signal with sidebands spaced from the suppressed carrier by 1000 cycles per second. The solenoid current may be supplied from a sinusoidal driver 38. An alternative balanced modulator that is especially useful in coaxial realizations of FIGURE 2 is a phase switch utilizing semiconductor diodes or switchable ferrite junction circulators. If the phase is abruptly changed by approximately 180 degrees at intervals of $\frac{1}{2000}$ second, a suppressed carrier signal is produced having principal side-band components at the carrier frequency plus and minus 1000 cycles per second.

The output of the balanced modulator 36 is coupled through an attenuator 40 to a component 42 under test. The attenuator may be selected to have an attenuation of approximately 20 db and a voltage standing wave ratio of 1.05 or less. The output terminal of the component 42 under test is coupled as indicated through an attenuator 44 similar to attenuator 40 but having an attenuation of approximately 10 db, and through an isolator 46 similar to isolators 32, 34 to a magic tee hybrid 48.

The magic tee hybrid 48 may be considered as a portion of the phase discriminator (circuit 12 of FIGURE 1) wherein the divided signals from the carrier wave source 24 are recombined and phase compared. The in-phase arms of the hybrid 48 are each coupled to an input arm of a respective 3 db directional coupler 50, 52, the other input arms of which are coupled to the quadrature output arms of a 3 db directional coupler 54. These 3 db directional couplers 50, 52, 54 may for example, be of the short slot hybrid type having well matched connection waveguide adapters and a VSWR better than 1.06 and an isolation between output arms of at least 30 db with a power balance therebetween of .25 db or better. Again an absorptive termination 30 is coupled to each of the unused arms.

A line stretcher 56 is inserted in the reference branch 14 and is coupled through an isolator 58 to the input arm of the 3 db directional coupler 54. The line stretcher 56 may be of the well known variety consisting of a short slot 3 db hybrid and a pair of short circuits moved in unison. In coaxial line systems, a simple line stretcher of the constant impedance type may be used. A novel line stretcher particularly useful in waveguide applications is illustrated in FIGURE 10 below.

The output terminal of the combining directional couplers 50, 52 are coupled respectively to detectors 60, 62 through an isolator 64 and direct current block 66 in each case. The detectors 60, 62 may be crystal detectors mounted in matched detector mounts to assure equal detector sensitivity. Bolometer detectors with direct current bias may also be used.

The output terminals of the detectors 60, 62 are coupled respectively to input terminals of a ratio computing circuit 65, the output signal of which is connected to a meter 66, the vertical deflection plate terminal of an oscilloscope 68, and a recorder 70. The horizontal deflection plates of the oscilloscope 68 may be coupled to the sweep signal generator 26 so that the horizontal deflection in the oscilloscope 68 may be synchronized with the frequency sweep of the carrier wave source 24.

In operation the line stretcher 56 and connecting lines in the reference branch 14 are selected to have a phase shift and a phase versus frequency slope which are approximately equal to those of the component under test 42. This reduces the variation of the quantity to be measured to a few degrees over the frequency band thus increasing the accuracy of measurement compared to that when the full phase variation of the component 42 is to be measured. Furthermore, since the line stretcher and additional lines inserted in the reference branch may have very nearly a linear phase response, the resulting phase difference data is highly accurate in cases where the deviation from phase linearity (phase distortion) of the component 42 under test is desired.

Considering the signals impressed upon the detectors 60, 62 as represented by the phasor diagram of FIGURE 3, it may be seen that the signal component at each detector from the reference branch 14 as represented by phasors 72, 74 are 90 degrees out of phase due to the quadrature phase relationship between the output arms of the 3 db directional coupler 54. The quadrature effects of the couplers 50, 52 are equal and do not effect the phase relationship between the phasors 72, 74 at the detectors. These phasors may be considered fixed since their phase interrelationship is constant and their amplitudes are not modulated. The phasors $E_{60}$ and $E_{62}$ which represent the peak amplitude of the modulated test signal are as indicated above, in phase with each other and their amplitude varies back and forth along the direction of the straight line of the phasors shown. The angle $\theta$ indicative of the phase difference between the modulated and unmodulated signals is the quantity to be determined.

When the effective modulation index is small and the carrier is constant, the amplitude detection in the crystal detectors is linear and is directly proportional to that component of the modulation which is in phase with the carrier phasor. In the case of the detector 60 its output signal is directly proportional to $\sin \theta$ while the output signal of the detector 60 is directly proportional to $\cos \theta$. It may be noted that the amplitude detection is linear, whatever the power law of the detector, in the same manner that the intermediate frequency output of a heterodyne mixer is directly proportional to the radio frequency input signal so long as the local oscillator output is relatively strong and constant.

The radio computer 64 then operates upon the combination of signals from the detectors 60, 62 in a manner to provide their quotient which is directly proportional to tan $\theta$ and is thereby a direct measure of the quantity to be determined.

In FIGURE 4 an example of the combining portion of the phase discriminator circuit of FIGURE 2 is illustrated, in which the three directional couplers and the magic tee hybrid are constructed in a composite waveguide structure. An input power dividing 3 db directional coupler 54' is illustrated as being adapted for connection to the reference branch of the network. The coupler comprises a pair of waveguide segments 80, 82 which each have a rectangular cross section and which have a common narrow waveguide wall 84 which is ported as shown to permit directional intercoupling from the segment 80 to the segment 82. The placement and size of the openings of the common wall 84 are selected to provide a directional 3 db coupling to the waveguide segment 82 which energy is 90 degrees out of phase with that remaining in the waveguide segment 80. That portion of the input energy which is coupled to the waveguide segment 82 is propagated therealong to a hybrid coupler 50' which may be constructed similarly to the coupler 54' except that it is arranged and connected in a manner to combine microwave energies from two paths instead of to divide the energy from a single path. The microwave energy propagating along the waveguide segment 82 is coupled in a reciprocal manner through the ported common side wall 86 of the combining coupler 50'.

In like manner the microwave energy from the reference branch which is propagated along the waveguide segment 80 is coupled through a ported common side wall 88 of the second combining hybrid 52'. The output arms of each of the combining couplers 50', 52' have disposed therein, respectively, a matched one of the detectors 60', 62'. It may be noted at this point that that portion of the microwave energy from the reference branch which propagates along the waveguide segment 80 to the detector 62' undergoes a single 90 degree phase shift as it is coupled through the ported wall 88 of the combining coupler 52'. On the other hand, that portion of the microwave energy from the reference branch which is coupled through the ported side wall 84 of the dividing hybrid coupler 54' and thence through the ported wall 86 of the combining hybrid coupler 50' undergoes two 90 degree phase shifts, such that, as indicated earlier, the microwave energy from the reference branch which is impressed upon the separate detectors 60', 62' is 90 degrees out of phase or in quadrature.

The other input arms 90, 92 of the combining hybrids 50', 52' are coupled respectively to the output arms 94, 96 of a folded T dividing hybrid 48', the input arm of which is coupled to the test branch of the network. An unused output arm 98 is coupled out of the magic tee hybrid 48' and is disposed in a direction orthogonal to the propagation of energy from the test branch and through the segments 94, 96. That is, the arm 98 is disposed in the direction into the plane of the drawing. Each of the unused arms of the four hybrids shown is terminated by a non-reflecting absorptive load 30'.

Again, as indicated above, the microwave energy from the test branch of the network enters the input arm of the magic tee hybrid 48' and is divided substantially evenly into the waveguide segments 94, 96 and each such portion is absorbed in a respective detector 60', 62' where it is mixed with a portion of the energy from the reference branch. As is understood in the art, the coupling in the combining hybrids 50', 52' is directional in a manner to preclude propagation into the waveguide segments 80, 82 through the ported common side walls 86, 88.

Figure 5:
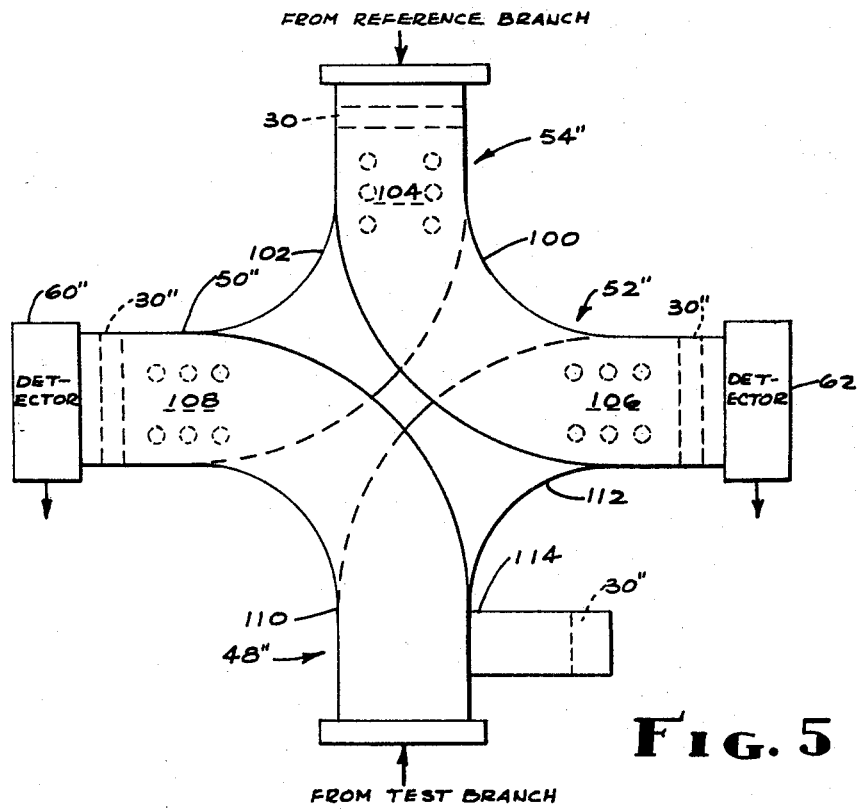
FIGURE 5 is a plan view of an alternative form of a waveguide version of a portion of the phase discriminator circuit of FIGURE 1.

Referring to FIGURE 5, a unitary waveguide structure example for the phase discriminator circuit, which is an alternative to the example illustrated in FIGURE 4, is presented. In FIGURE 5 the general orientation and function of the composite waveguide assembly is identical to that of the structure in FIGURE 4. In the present example, however, the 3 db couplers are topwall, or common broadwall, types instead of the common sidewall type of the previous example. A 3 db power dividing hybrid 54" is coupled to the reference branch as indicated and comprises generally two segments of waveguide 100, 102, which have a common ported broadwall 104. As in the previous example the straight-through portion of the microwave energy is coupled by the waveguide segment 100 to a combining hybrid 52" where it is coupled to a ported topwall 106 into the output arm of the combining detector which contains the detector 62". In a similar manner, that portion of the microwave energy from the reference branch which is coupled through the ported topwall 104 of the power dividing hybrid 54" is propagated through the waveguide segment 102 to the combining hybrid 50" where it is coupled through a ported common topwall 108 into the output arm of the hybrid which contains the detector 60".

A magic tee coupler 48" which is connected to the test branch has its in-phase output arms 110, 112 coupled directly to the detector arms of the combining hybrids 50", 52" respectively. The unused output arm 114 of the magic tee hybrid 48" is terminated by a resistive load 30" in like manner and, as in the previous example, the unused arm of each of the hybrids 50", 52", 54", is terminated by a resistive load 30".

Figure 6:
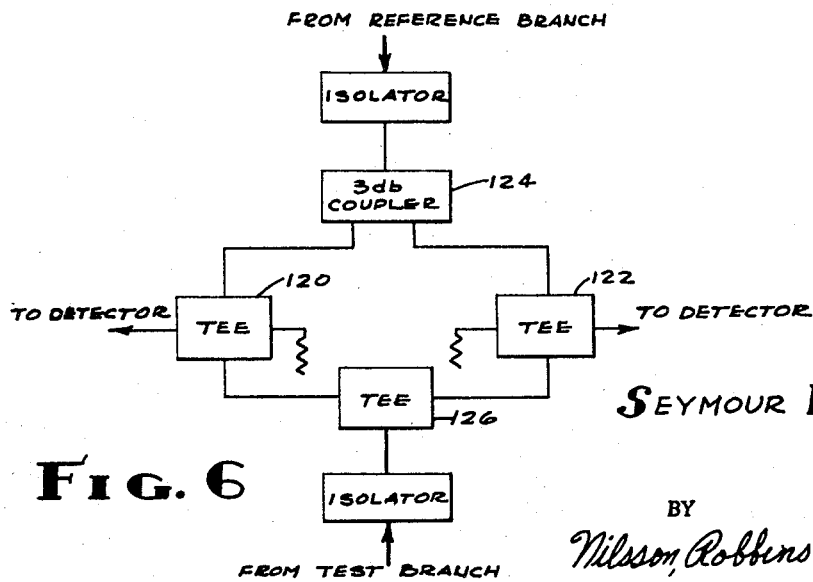
FIGURE 6 is a block diagram of an alternative example of a portion of the phase discriminator circuit.

In FIGURE 6 an example of the invention is illustrated schematically in which the combining hybrids of the phase discriminator circuit are each a magic tee hybrid 120, 122. As in the previous examples, a 3 db coupler 124 is connected to the reference branch and divides the microwave energy therefrom in quadrature to each of the combining hybrids; and a magic tee hybrid 126 is connected to the test branch of the network. The in-phase output arms of the tee 126 are coupled to the combining hybrids 120, 122. Although the combining in the hybrids 120, 122 is an in-phase process, the unmodulated component from the reference branch at the two detectors is in quadrature because of the output quadrature phase relationship caused by the dividing hybrid 124.

Figure 7:
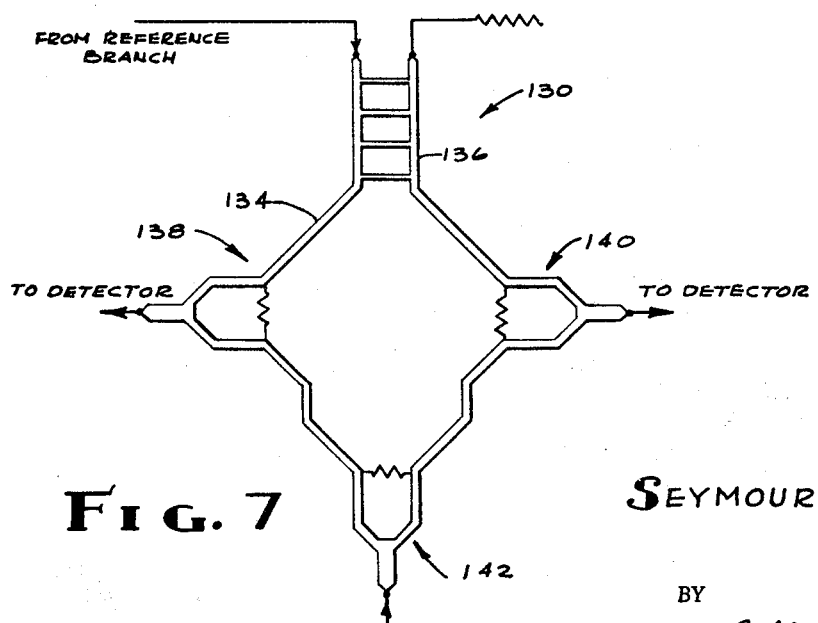
FIGURE 7 is a schematic diagram of a strip-line example of a portion of the phase discriminator circuit.

Referring to FIGURE 7, a composite strip-line structure example of a phase discriminator circuit is illustrated. This strip-line structure is mounted midway between parallel ground planes in the usual manner. A strip-line 3 db directional coupler 130 is shown with its input arm connected to the reference branch of the network and with its quadrature phased output arms 134, 136 connected respectively to an input arm of the strip-line combining hybrids 138, 140. The opposite input arms of the strip-line hybrids 138, 140 are coupled respectively to the output arms of a dividing hybrid 142, the input arm of which is connected to the test branch of the network. As in the previous examples the microwave energy from the test branch arrives at each of the detectors in phase, while the portions from the reference branch, which pass through the directional coupler 130, are in quadrature phase so that the function of the detectors is identical to that discussed in connection with the previous examples. A reference for the design and construction of strip-line hybrids 138, 140 and 142 may be found in Electronic Design, Aug. 31, 1960, pp. 52 and 53.

Referring to FIGURE 8 switching arrangements in accordance with the present invention are illustrated which enable the operator of the precision phase measuring equipment to read phase angles of any value to amplify, in effect, the phase angle readings on the indicating meter. The output terminals of the detector 60, 62 may be reversed by an input reversing switch 150 which is intercoupled between the detectors and the input terminals of the ratio computer 64. A decade resistance switch 152 is in series with one input to the ratio computer 64. As explained above, the output voltage of 64 is proportional to tan $\theta$. In a practical embodiment of the invention the first decade range provides a full scale ratio of unity, corresponding to an angle of 45 degrees. Thus the meter 66, not shown, covers zero to 45 degrees. With the second decade range the full scale ratio is 0.1, so that 0 to 5.71 degrees is covered. Similarly, the third decade range yields zero to .573 degree, and the fourth decade range yields zero to 0.0573 degree. In most applications it has been found that the first and second decades are sufficient since the second decade may be read with an accuracy better than 0.1 degree. If the input reversing switch 150 is changed to its other position, the connections of the detectors to the ratio computer are interchanged. In that case the output voltage of the ratio computer will be proportional to cot $\theta$. In the first decade attenuator range the indicated angle will therefore cover 90° to 45°. Thus, the switch 150 enables angles from 0 to 90 degrees to be measured. The polarity reversing switch 153, enables angles from 90 to 180 degrees to be measured, since in that quadrant tan $\theta$ and cot $\theta$ are negative. Now, since tan $\theta =$ tan ($\theta - 180°$ $n$) and cot $\theta =$ cot ($\theta - 180°$ $n$) where $n$ is an integer, it may be seen that all angles may be read on the 0 to 45° scale with the aid of switches 150 and 153. Hence these are called sector switches.

The repetition of readings every 180 degrees results in what is known as a 180 degree ambiguity. FIGURE 8 shows one circuit arrangement by which the 180 degree ambiguity may be eliminated, leaving only a 360 degree ambiguity. A modulation frequency voltage from the modulator driver 38 is introduced through switch 154 into the ratio computing circuit 64 in such manner that it adds a small voltage in series with one of the input circuits of the ratio computer. In certain angular sectors, the detected signal arriving at this particular input circuit will be in phase with the modulator driver voltage, while in other sectors it will be 180 degrees out of phase. In the former case the meter reading will change in one direction when switch 154 is closed, while in the latter case it will change in the other direction. From the direction of meter reading change and the positions of the sector switches 150 and 153, the angle reading may be definitely established with an uncertainty no smaller than 360 degrees. For convenience, 154 may be a push button switch that is closed only when depressed. A simple table of sector switch positions and direction of meter reading change provides very rapid determination of the angular sector being measured.

Referring to FIGURE 9 an example of the invention is illustrated which is particularly useful for the precision phase measuring of an active device such as an amplifier 180. A directional coupler 182 is utilized to divide the microwave energy from the carrier wave source 24 between the reference branch and the amplifier under test. The input terminal of the amplifier 180 under test may be connected to one of the output terminals of the dividing coupler 182 while its output terminal is connected to a second directional coupler 184. The directional coupler values are selected to yield outputs to the reference and test branches of 5 to 50 milliwatts while the two attenuator pads 40 and 44 in the test branch of FIGURE 2 may be connected directly together.

It may be noted, that when desired, a phase discriminator circuit may be utilized in which a 3 db directional coupler is connected to the test branch while an in-phase power dividing hybrid is connected to the reference branch. In this manner due to the in-phase properties of the hybrid tees and the quadrature properties of the directional coupler a reference signal from the reference branch arrives at the detectors in phase while the test signal arrives with a 90 degree phase difference. This causes one of the phasors in the phasor diagram of FIGURE 3 to be rotated 90 degrees so that the phasors 72, 74 are in phase, while the modulation components $E_{60}$, $E_{62}$ are 90 degrees out of phase. It has been demonstrated that the function of the detectors is exactly the same as in the previous example.

This latter alternative, namely that of placing the three db directional coupler in connection with the test branch, has been found to be as satisfactory as the first alternative shown in the figures if square law detectors such as bolometers or weakly driven crystals are used. However, the arrangements shown in the figures is preferable when strongly driven crystal detectors are used. With cw reference signals of about 0.1 to 1.0 milliwatts dissipated in the crystal, a change in reference signal power will result in a lesser change in detected signal power. As a result, any output unbalance of the 3 db coupler will produce a smaller unbalance in the detected signals. If the much weaker test signal entered the phase discriminator circuit through the 3 db coupler the coupler unbalance would produce an equal unbalance in the detected signals. The in-phase, or magic tee hybrid is inherently balanced by reason of its physical symmetry.

In FIGURE 10, a waveguide example of the line stretcher 56 (of FIGURE 1) is shown in which an input section 186 of rectangular (in this example) waveguide having a flange 188 is mounted upon a support base 190. A similar output section 192 with a flange 194 is mounted on the base 190 and disposed parallel to and symmetrically with respect to the input section 186.

A slidable, U-shaped coupler section 196 having parallel members, input by 198 and output by 200, is slidably inserted into the stationary input and output sections 186, 192. The degree of insertion of the coupler section, and consequently the effective length of the line stretcher, is controlled, in this example, by a micrometer link 202 having its base end 204 affixed to the support base 190 and its spindle 206 affixed to the coupler section 196.

Positive contact between the ends of the legs 198, 200, and the inner wall of the respective input and output section is achieved by outwardly urging fingers 208 one or more of which has a length of extension from its respective leg 198, 200 which is greater than the others; for example, the finger 210, as shown, is significantly longer than those indicated at 208.

In a particular constructed example of a line stretcher, as illustrated in FIGURE 10, designed for operation over the band 8,200 to 12,400 megacycles, the inner dimensions of the input and output sections 186, 196 are .900 by .400 inch, while those of legs 198, 200 of the coupler section are .860 by .360 inch. The wall thickness of the legs 198, 200 is .016 inch.

In this example the phase linearity, or deviations therefrom resulting from requency changes over the band or mechanical movements of the line stretcher elements, due to the U-shaped coupler section with its thin walls and contacting fingers 208, 210 is better by an order of magnitude than that of the best of the known prior art line stretchers.

The various phase discriminator circuits 12 of the examples of the invention illustrated in the previous figures each utilize a power splitting hybrid coupled either to the reference branch 14 or the test branch 18 to provide the required phase quadrature relation between a pair of corresponding radio frequency components from one of the branches impressed upon the detectors. Although this arrangement is practical and provides excellent results particularly for narrow band work or less sensitive broad band application, there are a significant number of broad band applications wherein extreme accuracy is desired over the entire band. In such applications, it is desirable to avoid the unbalance between the two output arms of the 3 db directional coupler. It is typical, for example, for this unbalance to cause the signals at the quadrature related output arms to vary ½ db each, in opposite senses whereby although the output signals are equal at a first frequency, they are a full decibel apart at a second frequency. Such an unbalance typically causes a phase error angle of 3 or more degrees at the said second frequency with zero error at the first frequency.

Figure 11:
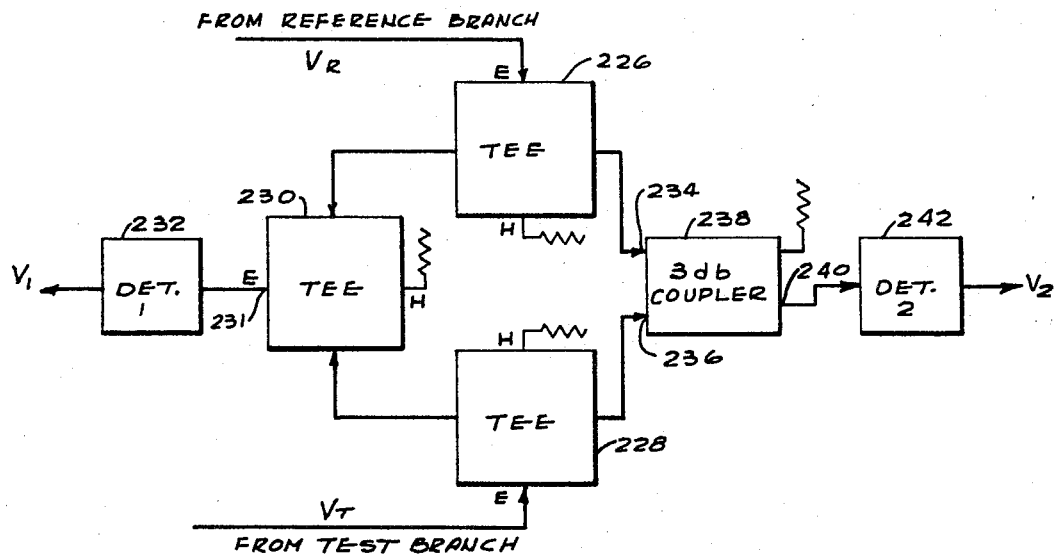
FIGURE 11 is a block diagram of a portion of an alternative example of a precision phase measurement system constructed in accordance with the principles of the invention.
Figure 13:
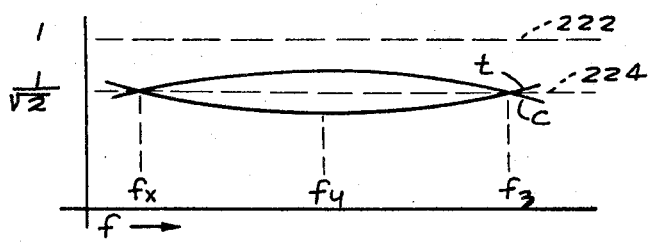
FIGURE 13 is a graph illustrating coupling factors, associated with the component of FIGURE 12, plotted as a function of frequency.
Figure 12:
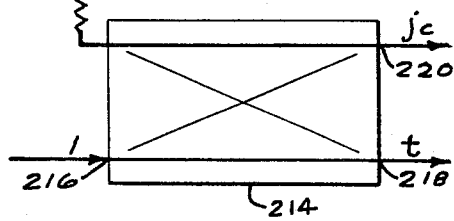
FIGURE 12 is a schematic diagram of a component shown in the network of FIGURE 11.

The examples of the discriminator circuit 12 of FIGURE 11 provides an inherent first order compensation for the unbalance exhibited by other such circuits. With reference to FIGURE 12 and FIGURE 13, the frequency sensitive unbalance of a typical 3 db directional coupler 214 is illustrated, and defined as follows: assuming an input signal of unity amplitude incident at the port 216, an output signal of amplitude $t$ is available at the port 218 and an output signal of amplitude $c$ and in quadrature phase relation therewith is available at the port 220 where $c$ and $t$ imply identification, respectively, of the "coupled" and "transmitted" portions of the signal impressed on the input terminal; and the $j$ nomenclature implies the orthogonal relation between the output signals.

The graph of FIGURE 13 illustrates a typical variation of the $c$ and $t$ factors over a band of operation. The ordinate represents amplitude of output signal assuming a constant unity input level shown by the horizontal reference line 222. At $f_x$ and $f_z$ on the abscissa the $c$ and $t$ levels are equal and are each equal to $$\frac{1}{\sqrt{2}} = .707$$

as shown by the reference line 224. At $f_y$, however, the $c$ and $t$ amplitudes are approximately 1 db separated which constitutes the subject unbalance.

With more specific reference now to the FIGURE 11, the phase discriminator circuit 12 includes a pair of splitting tee's 226, 228 connected at their E plane arms to the reference and test branch outputs respectively. One of the symmetrical output arms, or terminals, of the each of the T's 226, 228 is connected to a respective one of the symmetrical terminals of a combining tee 230, the output E terminal 231 of which is coupled to a detector 232. The other symmetrical arms of the splitting T's 226, 228 are coupled respectively to the quadrature related terminals 234, 236 of a combining 3 db directional coupler 238 the output terminal 240 of which is coupled to a detector 242.

The detectors 232, 242 are square low detectors such as crystal or bolometer types operating in their square low region. In this example, a bolometer type is presently deemed preferable because significantly greater amplitudes of radio frequency signal may be applied to maximize the discriminator sensitivity without driving the detector beyond its square low region. It should further be understood that the detectors 232, 242 are utilized here as mixing detectors each having two radio frequency components as inputs and providing an output signal whose amplitude is proportional to the *product* of the amplitudes of the incident radio frequency components.

By inspection it is clear that the phase discriminator circuit of FIGURE 11 is totally symmetrical from the input branches to the detectors except for the quadrature producing component 238. It is desired that the detected amplitudes, at the output terminals of the detectors 232, 242, be equal (or at least related by a simple constant factor) over the full width of the frequency band of operation. This desired result obviously would be achieved by the symmetry of the circuit but for the frequency dependent unbalance between the coupling factors $t$ and $c$ introduced by the coupler 238.

In accordance with the principles of the present invention, however, this unbalance, except possibly for some higher order considerations, is automatically compensated for or equalized.

To demonstrate or prove the equalization objective consider that at the output terminal 231 of the hybrid 230, there are two radio frequency components, one from the reference branch through the tee 226 and one from the test branch through the tee 228. The latter signal component is actually the modulated carrier (suppressed) with its two side bands but may be considered for the present purposes as a single component of amplitude $V_T$. The corresponding amplitude of the reference branch signal is denoted $V_R$.

The resultant component amplitude at the terminal 231 due to $$V_R \text{ is } \frac{1}{\sqrt{2}} \cdot \frac{1}{\sqrt{2}} V_R$$

while that due to $$V_T \text{ is } \frac{1}{\sqrt{2}} \cdot \frac{1}{\sqrt{2}} V_T$$

Hence the output of the product low mixer detector 232 is $$V_1 = \frac{K}{4} 1 V_R V_T$$

Similarly, the amplitude of the radio frequency component at the terminal 240 due to $$V_R \text{ is } \frac{1}{\sqrt{2}} c V_R$$

while that due to $V_T$ is $$\frac{1}{\sqrt{2}} t V_T$$

Hence the modulation frequency signal output amplitude of the detector 242 is $$V_2 = \frac{K_2}{2} c t V_R V_T$$

This assumes maximum instantaneous values of the amplitude $V_R$ and $V_T$ and ignores phasing.

Figure 14:
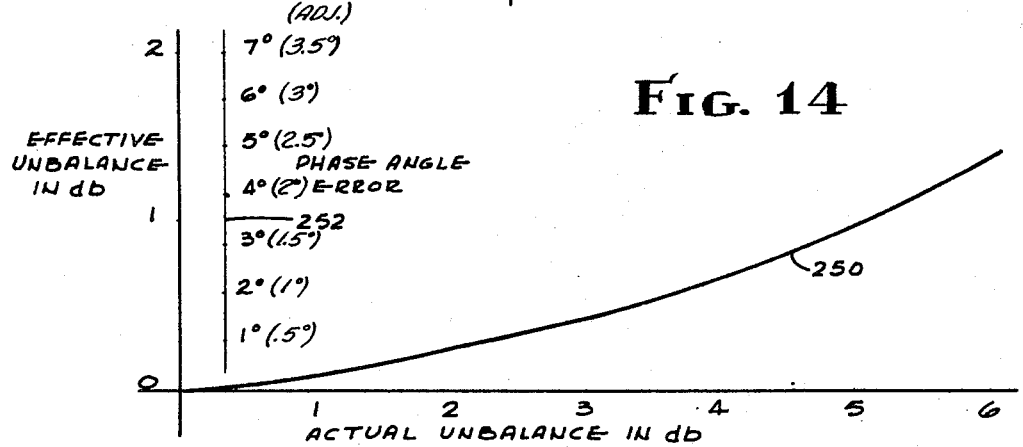
FIGURE 14 is a graph illustrating measured phase angle error as a function of unbalance associated with the circuit of FIGURE 11.

It may therefore be concluded that if $$\frac{K}{4} 1 = \frac{K}{2} 2ct$$

i.e. $2ct = 1$ (since $K_1 = K_2$ for identical detectors) then amplitudes $V_1 = V_2$. By observation of the $c$ and $t$ curves of the plot of FIGURE 13 it may be seen that, to at least a first approximation, 2 $ct$ does equal unity. To verify this and determine quantitatively how good the approximation is, the actual unbalance has been computed for a typical 3 db directional coupler. The results are represented by the curve 250 of FIGURE 14 which plots effective unbalance on the ordinate as a function of actual unbalance on the abscissa. A secondary ordinate 252 illustrates the actual phase angle error which results directly from the effective unbalance. It may be noted that the phase angle error depends only upon the absolute value of the magnitude of unbalance in db, and not upon whether $c$ or $t$ is greater. Therefore, the ordinate scale values of FIGURE 14 may be divided by 2 by adjusting the detectors sensitivity to yield zero phase angle error at one half of the maximum effective unbalance, instead of adjusting it at zero error for zero unbalance. This is indicated by the ADJ ordinate scale of FIGURE 14. In the 1 db example taken above, for 1 db maximum actual unbalance, the corresponding effective unbalance is .06 db which results in .19° maximum phase error. Then, by the adjustment as above, the actual maximum phase error is a fluctuation of .095° above and below the new zero.

Figure 15:
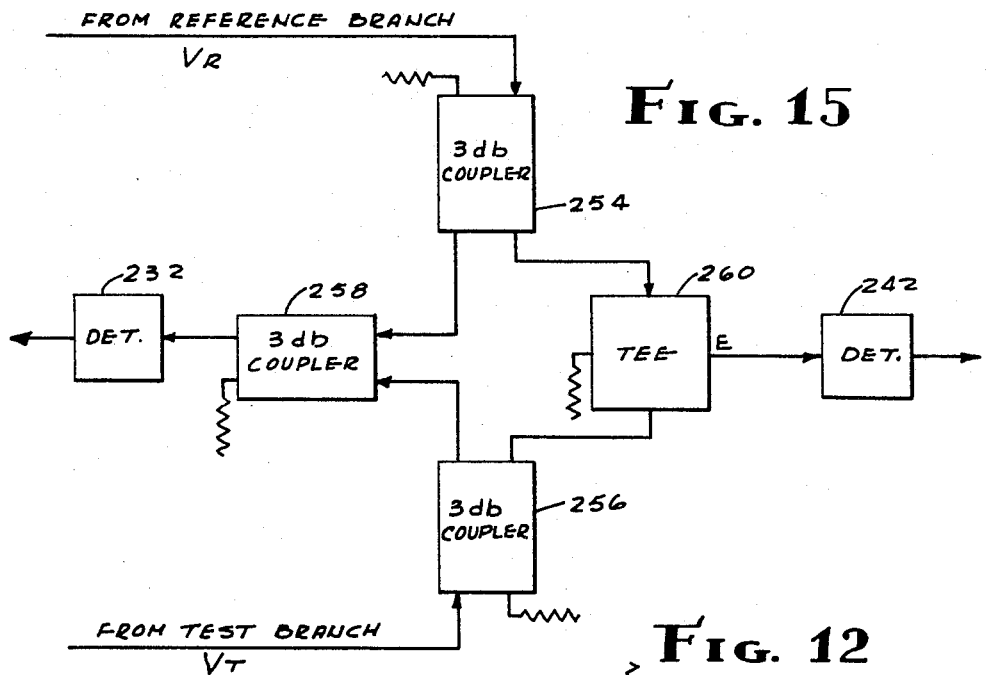
FIGURE 15 and FIGURE 16 are block diagrams of discriminator portions of additional, alternative examples of the invention.

Referring to FIGURE 15, an example of an alternative phase discriminator circuit in accordance with the invention is illustrated as including three identical 3 db directional couplers 254, 256, 258 and one tee hybrid 260. The reference branch is coupled by the thru side of the coupler 254 to one symmetrical side arm or terminal of the combining tee 260. The coupler 254, by its cross or "coupled" branch, couples the reference branch signal to the "thru" branch of the combining coupler 258.

In like manner, the test branch is coupled "thru" the coupler 256 to the "cross" branch of the combining hybrid 258; and "across" the coupler 256 to the other symmetrical side terminal of the combining tee 260. The "thru" branch of the coupler 258 is connected to the detector 232;

and the E arm of the tee 260 is connected to the detector 242.

To establish the intrinsic compensation or equalization of all $c$ versus $t$ type of unbalance in the phase discriminator circuit of FIGURE 15 consider that the amplitudes of the radio frequency components at the detector 232 are: due to $V_R$, $ctV_R$; and, due to $V_T$, $ctV_T$. Accordingly the output amplitude of the detector 232 is $K_1c^2t^2V_RV_T$. Similarly, the radio frequency component amplitudes at the detector 242 are: due to $$V_R, t\frac{1}{\sqrt{2}}V_R$$

and, due to $$V_T, c\frac{1}{\sqrt{2}}V_T$$

Accordingly, the output amplitude of the detector 242 is $$\frac{K_2}{2}ctV_RV_T$$

As in the example of FIGURE 11, when $$K_1c^2t^2V_RV_T=\frac{K_2}{2}ctV_RV_T$$

or $2\ ct=1$ the unbalance of the circuit is equalized for the same reasons and to the same degree and by the same operations as discussed in connection with FIGURES 11, 12, 13, and 14.

Figure 16:
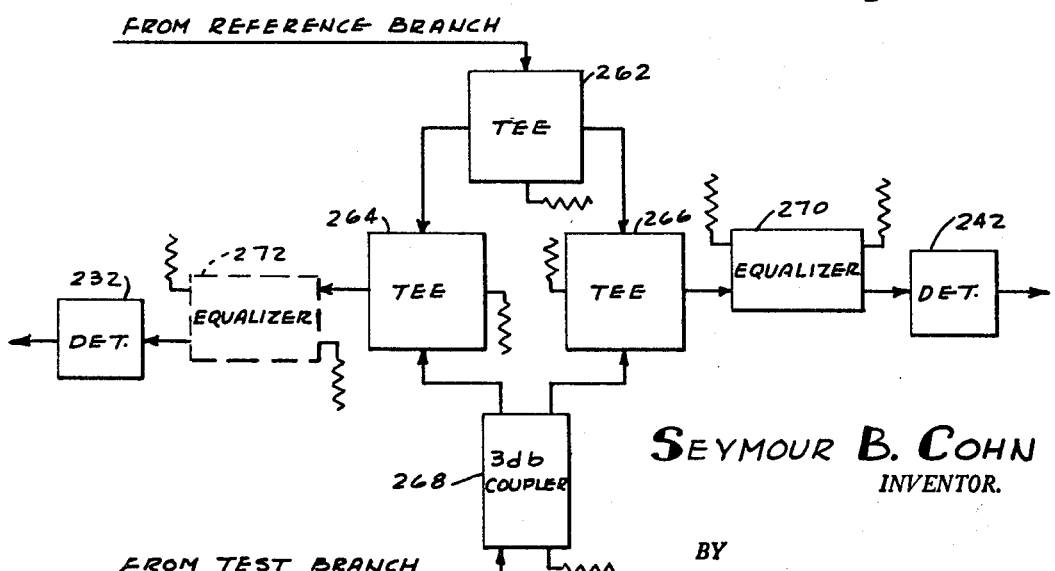

Referring to FIGURE 16, an example of the invention similar, in most of its essential respects, to that of FIGURE 6 or FIGURE 7 is illustrated in which three tee hybrids 262, 264, 266, and one 3 db directional coupler 268 are arranged, as shown, to couple the reference and test branches to the detectors 232, 242. In this example, a substantially precise symmetry may be achieved except for the disymmetry introduced by the quadrature splitting coupler 268. This dissymmetry or unbalance is substantially equalized here by coupling in front of the detector 242 an equalizing component 270 which is designed in a manner to adjust the amplitude seen by the detector 242 by inserting a frequency dependent attenuation characteristic which is the inverse, across the frequency band, of the resultant non-linearity otherwise existant at the detector 242 with respect to that seen by the detector 232.

A practical example of such an equalizer is a 3 db coupler identical to the coupler 268 and coupled with its "thru" branch in series with the detector input while the coupling through the coupler 268 to that side of the discriminator is "across" the coupler 268.

Similarly another 3 db coupler identical to the coupler 268 may be interposed in front of the detector 232 with its terminals coupled in "cross" manner. It should be noted that 3 db coupler-equalizers 270, 272 may be utilized, as shown either conjunctively or disjunctively to achieve the desired equalization characteristic. It is further pointed out that each of the equalizers 270, 272, when in the 3 db coupler form, will effectively attenuate its respective detector's output by approximately an average of 6 db, since *each* radio frequency component from both test and reference branches is attenuated 3 db. However, any "unbalance" of this character, which may also be encountered to a different degree in some of the previous examples, is readily equalized by adjustment of the sensitives or amplifications of the channels following each of the detectors 232, 242. Since the signals in these channels are at audio frequency, simple resistors, for example, may be employed to achieve the desired, flat balancing.

Figure 17:
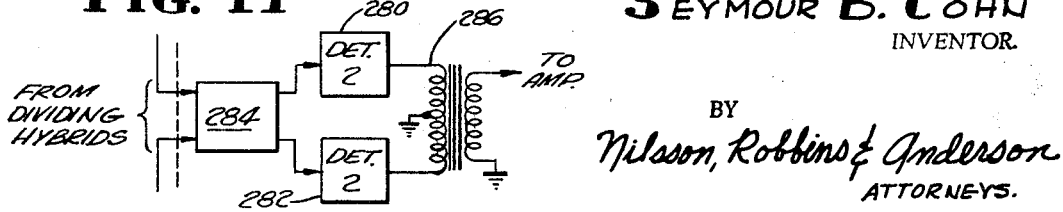
FIGURE 17 is a block diagram of a detector portion of an alternative example of the phase measurement system of the invention.

Referring to FIGURE 17, a portion of an example of the invention is illustrated which inclues a pair of balanced mixer detectors 280, 282 at the output terminals of each four port combining component 284 of the phase discriminator networks of the previous figures. The component 284 may for example represent in FIGURE 17 the 3 db coupler 238 or the tee 230 of FIGURE 11, or the 3 db coupler 258 or tee 260 of FIGURE 15. In this regard, it may be noted that each of the combining hybrids of the previous figures has an output arm or terminal which is shown terminated by a resistive load with the other output arm being coupled to a single detector. In the present example, each of these arms is shown connected to one of a substantially identical pair of detectors 280, 282, the output of each of which is coupled, in this example, to the input terminals of a balanced input, audio output type of transformer 286, the input side of which is centertapped to a common, or ground buss as shown, and the output side of which is coupled to an appropriate amplifier channel not shown.

Some particular advantages of the balanced detectors are that a larger dynamic range of amplitude variation is permissible for the system; and the balanced detectors configuration is particularly useful when an amplitude, or unbalanced, modulation technique is used in the test branch. In this same regard it may be noted that the balanced detector arrangement discriminates against any non-suppressed carrier component thereby often further enhancing the performance of the system, even when a balanced modulation technique is utilized. Similarly, the balanced detector arrangement discriminates against other common mode noise as well.

There have thus been disclosed and described a number of examples of a precision phase measuring system which achieves the objects and exhibits the advantages set forth hereinabove.

What is claimed is:

1. Precision phase measuring system comprising:

reference and test network branches each coupled to a radio frequency source; phase discriminator circuit for determining the phase difference angle $\theta$ between the phase delays experienced by the radio frequency energy in the separate branches, said circuit including:

a tee hybrid coupler radio frequency energy di- and second output terminals, said input terminal of said tee hybrid coupler being coupled to said reference branch;

a 3 db coupler radio frequency energy dividing means having an input terminal and first and second output terminals which are in phase quadrature with respect to each other, said input terminal of said 3 db coupler being coupled to said test branch;

first and second radio frequency energy combining means each being a tee hybrid coupler and each having at least one output terminal and first and second input terminals, said first output terminal of said tee hybrid couper and 3 db coupler radio frequency energy dividing means being coupled to different ones of said input terminals of said first radio frequency energy combining means, said second output terminals of said tee hybrid coupler and 3 db coupler radio frequency energy dividing means being coupled to different ones of said input terminals of said second radio frequency energy combining means;

first detector means coupled to said at least one output terminal of said first radio frequency energy combining means for providing a signal representative of sine $\theta$;

a second 3 db coupler substantially identical to said 3 db coupler radio frequency energy dividing means coupled to said at least one output terminal of said second radio frequency energy combining means;

second detector means coupled to one output terminal of said second 3 db coupler for providing a signal representative of cos $\theta$ and phase angle determining means coupled to both said first and second detector means upon which said signals, representative of sine θ and cos θ are impressed for providing, responsive thereto, a signal representative of the magnitude of θ.

2. The invention according to claim 1 in which each of said tee and 3 db couplers are strip line components.

3. A precision phase measuring system as defined in claim 1 wherein 3 db couplers are substituted for first and second tee hybrid couplers radio frequency energy combining means.

References Cited

UNITED STATES PATENTS

| | | | |
|---|---|---|---|
| 2,358,462 | 9/1944 | Mahren | 324—58 |
| 2,405,073 | 7/1946 | Troell | 324—87 |
| 2,617,853 | 11/1952 | Gilmer | 324—58 |
| 2,876,416 | 3/1959 | Vinding | 324—58 |
| 2,954,524 | 9/1960 | Nelson | 324—83 X |
| 2,983,866 | 5/1961 | Alford, et al. | 324—58 |
| 3,147,435 | 9/1964 | Blattner | 324—84 X |
| 3,281,679 | 10/1966 | Schafer | 324—84 X |
| 3,012,210 | 12/1961 | Nigg | 333—84 |

OTHER REFERENCES

Electronic Industries, May 1961, pp. 110–113.

IRE International Convention Record, vol. 9, pt. 3 (1961), pp. 147–150, article by Cohn et al.

RUDOLPH V. ROLINEC, *Primary Examiner.*

P. F. WILLE, *Assistant Examiner.*